Aug. 21, 1923.

O. C. WHITE

POULTRY DRINKING FOUNTAIN

Filed March 4, 1922

1,465,503

Inventor
Oliver C. White,
By
R. S. Berr
Attorney

Patented Aug. 21, 1923.

1,465,503

UNITED STATES PATENT OFFICE.

OLIVER C. WHITE, OF GARDENA, CALIFORNIA.

POULTRY DRINKING FOUNTAIN.

Application filed March 4, 1922. Serial No. 541,046.

*To all whom it may concern:*

Be it known that I, OLIVER C. WHITE, a citizen of the United States, residing at Gardena, in the county of Los Angeles and State of California, have invented new and useful Improvements in Poultry Drinking Fountains, of which the following is a specification.

My invention relates to a poultry drinking trough which is especially applicable for use in supplying water to young chicks, and the purpose thereof is to provide a drinking trough so constructed that the chicks will not be liable to get into or perch on the trough, and which serves to protect the water in the trough against becoming fouled or contaminated.

An object of the invention is to provide a trough with a guard which will move when a chick attempts to perch thereon in such a manner as to prevent the chick from obtaining a foothold.

With the foregoing objects in view, together with such other objects and advantages as may subsequently appear, I employ the construction hereinafter described and claimed, and illustrated in the accompanying drawings, in which:—

Figure 1:
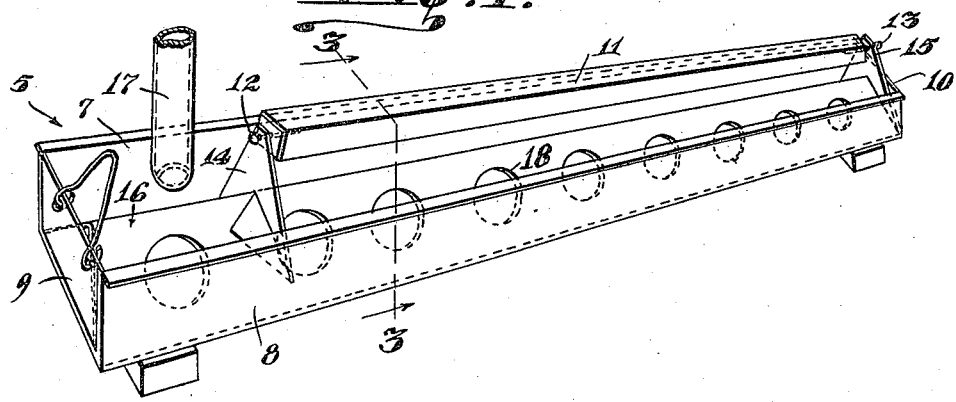
Figure 1 is a perspective view of the trough.
Figure 2:
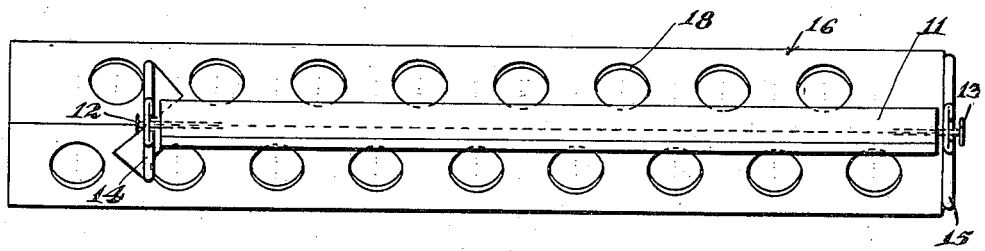
Fig. 2 is a plan view of the guard.
Figure 3:
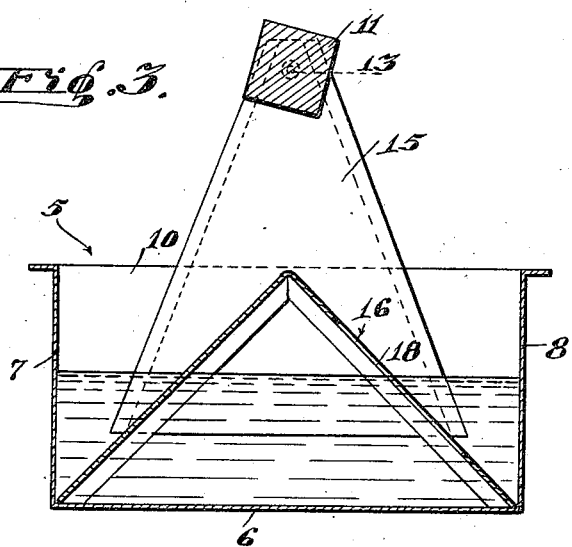
Fig. 3 is a sectional view on line 3—3 of Fig. 1.

More specifically, 5 indicates a trough which is preferably of rectangular cross section and comprises a botton wall 6, side walls 7 and 8, and end walls 9 and 10.

A rotary bar 11 is provided, the bar being preferably rectangular in cross section and supported at its ends by pins 12 and 13 in standards 14 and 15 and arranged to extend longitudinally of the trough centrally thereof and on a plane a short distance above the sides of the trough. The bar may thus be rotated on its longitudinal axis.

The standards 14 and 15 are carried on an inverted V-shaped base 16 formed of sheet metal and adapted to set in the trough with its edges seating in the angle formed by the juncture of the bottom and side walls of the trough; the side of the base thus being inclined.

The base 16 is preferably of a length substantially corresponding to the length of the trough so that its ends will abut against the end walls of the trough, and the standards 14 and 15 are arranged on the base with one of the standards located at the end thereof so as to be positioned adjacent one end wall of the trough while the other standard is spaced from the other end of the base so as to be arranged in spaced relation to the other end of the trough to provide room at the end of the rotary bar to receive the discharge end of a drop nozzle 17 by which water is supplied to the trough.

The base 16 is formed with a row of apertures 18 on each of its inclined side portions which serve, when the trough is partly filled with water to a level extending on to a plane approximately through the centers of the apertures, to permit light to pass to the under side of the base.

The sides of the base being inclined afford a water space between the outwardly projecting portion of the base and the sides of the trough to which the chicks have access. The rotary bar is arranged sufficiently close to the ridge of the base directly there above that chicks cannot perch on the base, and is arranged sufficiently close to the edges of the trough as to crowd chicks attempting to roost on the trough, and being pivoted to rotate will serve to prevent chicks from roosting on the bar, as the bar will quickly turn when a chick attempts to perch thereon, thereby preventing the chick from gaining a foothold.

The base 16 is adapted to be removed from the trough so that the latter may be readily cleaned and whereby the trough may be used without the guard if so desired.

I claim:

A poultry drinking fountain comprising a trough having bottom side and end walls, an inverted V-shaped base fitting the bottom of the trough and having a row of circular apertures in each inclined side, standards mounted on the base, and a rectangular bar rotatably mounted in the standards; the rotary bar being so close to the ridge of the base that chicks cannot roost on the base and close enough to the edges of the trough to crowd the chicks attempting to roost on the trough, and the bar being so easily rotatable that a chick cannot roost on the bar.

OLIVER C. WHITE.